United States Patent Office 2,813,093
Patented Nov. 12, 1957

2,813,093

UNGELATINIZED TERTIARY AMINO ALKYL ETHERS OF AMYLACEOUS MATERIALS

Carlyle Gordon Caldwell and Otto B. Wurzburg, Plainfield, N. J., assignors to National Starch Products Inc., New York, N. Y., a corporation of Delaware No Drawing. Application June 10, 1953,
Serial No. 360,818

7 Claims. (Cl. 260—233.3)

Our invention relates to a method for the etherification of starches, and to the novel and valuable products made thereby. One object of our invention is the production of an additive for paper pulps, to achieve notable increases in the strength of paper. Another object is the production of improved thickening agents for use in the plissé process for printing nylon fabrics. Still another object is the production of adhesives. Other industrial uses of our products will become apparent from the subsequent description of their properties.

Our invention comprises the manufacture of ethers of starches wherein the substituent radical contains a tertiary amino group. Examples of this type of derivatives include the dialkyl amino alkyl, and dialkyl amino hydroxyalkyl ethers of starches as well as the corresponding aryl and aralkyl derivatives.

By the term "starch" we mean amylaceous substances such as untreated starch, as well as starch derivatives including dextrinized, hydrolized, oxidized, esterified and etherified starches still retaining amylaceous material. The starches may be derived from any sources, including corn, wheat, potato, tapioca, waxy maize, sago or rice.

We have found that such products can be made by etherifying a starch with an etherifying agent selected from the group, dialkyl amino alkyl epoxides, dialkyl amino alkyl halides, and the corresponding compounds containing aryl groups in addition to the alkyl groups.

All of the types of etherifying agents listed here, have the common characteristic of reacting with hydroxyl groups of the starch through an ether linkage under the reaction conditions herein described, and thereby introducing a tertiary amino radical into the starch or gum.

Representative examples of suitable etherification agents for the purposes of our invention include b-diethyl amino ethyl chloride; b-dimethyl amino isopropyl chloride; b-dimethyl amino ethyl chloride; 3-dibutyl amino 1,2 epoxypropane; 2-bromo-5-diethyl amino pentane hydrobromide, N-(2,3 epoxypropyl) piperidine; N,N-(2,3 epoxypropyl) methyl aniline. The various halides (e. g., chloro-, bromo-, etc.) can be used interchangeably.

In the above reagents, where we have indicated the free amines (e. g., b-diethyl amino ethyl chloride), we can also use the hydrochloride or other salts of these reagents (e. g., b-diethyl amino ethyl chloride hydrochloride). In fact, we ordinarily prefer to use the salts, since these are often less toxic and more convenient to handle. The hydrochloride moiety takes no part in the etherification reaction.

It will also be seen that beside the alkyl, aryl and aralkyl types, our reagents may include those containing cyclic groups. Therefore when we refer in the claims to the alkyl, aryl and aralkyl groups, it will be understood that the cyclic reagents are equivalents of these types.

In the subsequent examples, it will also be noted that the product of our invention may also be treated so as to result in the quaternary ammonium salt.

Broadly all of our products may be described by the structural formula:

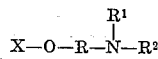

wherein X is starch, R is a radical selected from the group consisting of alkylene and hydroxyalkylene radicals, and each of $R^1$ and $R^2$ is a radical selected from the group consisting of alkyl, aryl and aralkyl radicals.

It is our belief that the introduction of the tertiary amino group adds a positive electrical charge to the starch molecule, and this in turn may explain the remarkably increased affinity of our products for negatively charged materials such, for example, as the cellulose in paper beater mixtures. Our products are of particular value, therefore, as beater additives in the manufacture of paper, substantially increasing the strength of the finished paper.

When the products of our invention are cooked in water, the resulting dispersions or pastes are characterized by improved stability (resistance to change of viscosity upon storage) and they are particularly resistant to the deleterious effects of low pH values. Thus, while an ordinary commercial corn starch, cooked in water and acidified to pH 3 will form an opaque mass upon cooling, the corresponding etherified amine derivative of our invention, under the same pH conditions, is relatively clear and fluid. This is of real importance where such materials, whether in the form of adhesives, binders, thickeners or additives, encounter acid conditions.

In a different industrial operation, the plissé printing of nylon fabric, a water solution of phenol is applied to nylon fabric to produce a characteristic puckered effect. For proper application, it is necessary that the solution be properly thickened, and a dispersed starch would be the most desirable and economically practicable thickener. However, phenol tends to precipitate the starch, making the use of ordinary starch for this purpose unfeasible. We have found, quite unpredictably, that the amine starch derivatives of our invention have excellent compatability with phenol, and they have therefore been found of distinct value in this type of thickening operation.

The technique of our process is preferably practiced in the following manner. The starch is treated with the etherification reagent in the presence of an alkaline medium. Preferably, this is accomplished by suspending the starch in water, to which has been added (either before or after addition of the starch) sufficient base, such as an alkali metal hydroxide, quaternary ammonium hydroxide, or the like, to maintain the mixture in an alkaline state during the reaction. The required amount of the tertiary amine etherification reagent is then added, with constant agitation. When the etherification is accomplished by means of a halo compound, the progress of the reaction can easily be followed by noting the consumption of the base. Thus, when titration or pH measurement indicates a constant value for the base, the reaction may be assumed, for practical purposes, to be complete.

It is well known that starch, which in its natural state is in the form of discrete granules, will in the presence of water and sufficient alkali, undergo gelatinization. The phenomenon of gelatinization involves the swelling, rupture and disintegration of the starch granule, so that it will disperse in water to form a homogeneous hydrated colloidal dispersion, whereas ungelatinized starch granules, on the other hand, will settle out of water suspension and may be filtered and dried, still retaining their original granule form. In order to obtain a starch product which may be sold as a dry powder which retains the granular form of the original starch, it is necessary to avoid gelatinization of the starch. In order to avoid gelatinization, when considerable alkali and water are present, we prefer to add a known gelatinization retarding chemical, such as sodium sulfate.

The reaction may also take place in the absence of added water, other than that normally present in the starch. By this method, the starch is suspended in an inert medium such as, for example, isopropyl alcohol. An alkaline material is added, such as quaternary ammonium hydroxide. The mixture is heated at reflux temperatures to complete the etherification reaction, and the ether is easily filtered off.

The proportion of etherification reagent to be used will vary with the particular reagent chosen (since they naturally vary in reactivity and reaction efficiency) and the degree of substitution desired. Thus, we have obtained products with substantially improved properties by using as little as 0.5% etherification reagent, based on the weight of the starch, and on the other hand have successfully employed quantities as high as 30%, as will be seen from the examples.

The following examples will further illustrate the embodiment of our invention:

Example I

In this as well as the subsequent examples, all parts given are by weight.

This example illustrates the treatment of corn starch with b-diethyl amino ethyl chloride hydrochloride, a tertiary amine.

Four lbs. sodium hydroxide were dissolved in 150 lbs. water, and 50 lbs. sodium sulfate were added. Agitation was continued until the materials were dissolved, and there were then added, with continued agitation, 100 lbs. corn starch. When the suspension was uniform, there was added a solution of 4 lbs. b-diethyl amino ethyl chloride hydrochloride in 25 lbs. water. Agitation was maintained for 24 hours, at which time enough dilute hydrochloric acid solution was added to adjust the pH to approximately 3. The starch product was then filtered, washed thoroughly with water and dried.

The resulting starch ether corresponded to the diagrammatic formula

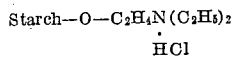

Starch—O—C$_2$H$_4$N(C$_2$H$_5$)$_2$
HCl

When one part of the product was cooked in 12 parts of water for ½ hour at 200° F., it formed a sol which upon cooling was clearer and considerably more stable against viscosity change than a corresponding cook-up of untreated starch. The product was found to be of interest for use in the paper industry as a beater additive.

Example II

Example I was repeated, except that the final product was not neutralized, but rather was filtered on the alkaline side, washed and dried. Thus the final product contained the free amine group rather than the amine salt (the salt having been formed in Example I by the neutralization with HCl). The formula of the product of this present example may be diagrammatically represented as follows: Starch—O—C$_2$H$_5$N(C$_2$H$_5$)$_2$.

Example I was again repeated, except that b-diethyl amino ethyl chloride was used. It is usually found more convenient to use the amine reagent in the form of its salt. Similarly, we repeated Example I again, using b-dimethyl amino ethyl chloride hydrochloride as the etherification reagent.

The products were in all ways comparable in properties to that of Example I.

Example III

The proportions and procedures of Example I were repeated, except that in one case we used tapioca starch; in another case we used corn starch which had been oxidized with sodium hypochlorite solution to a degree known in the trade as 87 fluidity; in the third case we used a corn starch which had been acid-converted to a degree known in the trade as 60 fluidity. Like the product of Example I, these products were also found to posess the improved characteristics already described.

Example IV

This example illustrates the treatment of an acid-converted corn starch with b-dimethyl amino isopropyl chloride hydrochloride, a tertiary amine salt.

One lb. of potassium hydroxide was dissolved in 150 lbs. of water to which there were then added 100 lbs. of corn starch acid-converted to a degree known in the trade as 60 fluidity. Constant agitation was maintained. When the suspension was uniform, there was added a solution of ½ lb. b-dimethyl amino isopropyl chloride hydrochloride in 10 lbs. water. Agitation was maintained at 90° F. overnight, whereupon the mixture was neutralized with dilute hydrochloric acid, filtered, washed and dried. The product corresponded to the diagrammatic formula

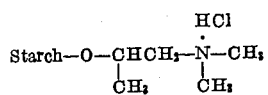

Example V

This example illustrates the treatment of corn starch with an epoxy alkyl amine etherifying reagent.

The procedures and proportions of Example I were repeated, except that instead of the b-diethyl amino ethyl chloride, we used 3 dibutyl amino 1,2 epoxypropane. In this case, etherification was accomplished through the epoxy rather than the halide group, and the resulting product was, like the other products of our invention, a starch ether containing an amine radical within the substituent ether group. Its formula may be diagrammatically represented as

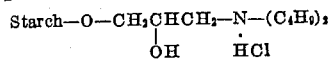

In all respects, the product of this example was comparable in properties to that of Example I.

Example VI

This example illustrates the preparation of the quaternary ammonium salt of a starch ether containing a tertiary amine.

Twenty parts of the product of Example I were suspended in 100 parts of ethanol containing 10 parts of methyl iodide. The suspension was heated at reflux for 2 hours, and was then allowed to cool and the starch was filtered and dried under vacuum. The resulting product was the quarternary ammonium salt of the starch product, and may be represented diagrammatically by the formula

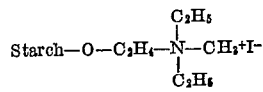

When heated in water, the product gelatinized very rapidly to give a water-clear sol.

Example VII

This example illustrates the use of a halo alkyl amine, wherein bromine is the halogen.

The proportions and procedures of Example I were repeated, except that the etherification reagent used was 2-bromo-5-diethyl amino pentane hydrobromide. The resultant product was comparable in all respects to that of Example I.

Example VIII

This example illustrates the treatment of sago starch with b-diethyl amino ethyl chloride hydrochloride, a tertiary amine.

Three parts sodium hydroxide were dissolved in 150 parts water and 30 parts sodium sulfate were added. To this solution there were added, with constant agitation, 100 parts of sago starch. When the suspension was uniform, there was added a soltuion of two parts of b-diethyl amino ethyl chloride hydrochloride in 25 parts water. The suspension was heated at 120° F., with constant agitation, overnight, at which time enough dilute hydrochloric acid solution was added to adjust the pH to approximately 3. The starch was then filtered, washed thoroughly with water and dried. Upon examination, it exhibited the improved characteristics already described, and was found to be of particular value as a paper beater size, as well as a thickener in the plissé process.

*Example IX*

This example illustrates the use of the product of our invention in the plissé process for treating nylon. It is known that phenol has a solvent effect upon nylon. Thus, when phenol is applied to nylon, it changes the dimensions of the fabric in those spots where it is applied, and upon drying results in a puckered effect. This is the basis of the so-called plissé process. However, as previously stated, it is necessary in actual industrial application, that the phenol be thickened so that it can be properly applied. Ordinary starches are not suitable for this purpose because of their incompatability with phenol.

Seven parts of the product of Example VII were mixed with 93 parts of water and cooked to a smooth paste. Two parts of this paste were mixed with one part of phenol. The mixture remained viscous and smooth with no perceptible coagulation or separation of the starch. This paste was then applied to the nylon fabric in the customary manner by means of intaglio engraved rollers. This proved to be a most efficient method for producing the desired puckered effect.

*Example X*

This example illustrates the use of the product of our invention as an additive to paper beater pulps.

In the course of the paper making process, there was added to the pulp in the beater, 0.1% of the tapioca product of Example III, based on the dry weight of the pulp. The other desired ingredients were added, and the procedures for paper making were carried forth in the customary manner. It was found that the resulting paper was substantially stronger; possessed greater retention of the starch on the paper fibers and greater retention of the filler (i. e., clay, titanium dioxide, etc.) as compared to a corresponding paper made without the use of this additive.

Depending upon the particular type of paper being produced, and the operating conditions, the amount of additive was varied from about 0.1% to about 4%, based on the dry weight of the pulp. In many cases it was found desirable that the starch additive first be cooked with water to form a gelatinized dispersion, before adding to the beater.

The etherification reagents may contain short or long carbon chains. Example XI illustrates a long-chain reagent.

Also, as already stated, the etherification reagents may be of the cyclic type, as illustrated by Example XII.

*Example XI*

The proportions and procedures of Example I were repeated, except that in place of the b-diethyl amino ethyl chloride hydrochloride, we used dioctyl amino ethyl chloride hydrochloride. The resulting product was characterized by the improved properties already described.

*Example XII*

This example illustrates the treatment of corn starch with cyclic amino reagents.

The proportions and procedures of Example I were repeated, except that in place of the b-diethyl amino ethyl chloride hydrochloride, we used, in one case, N-(2,3 epoxypropyl) piperidine; in another case we used N,N-(2,3 epoxypropyl) methyl aniline. The resulting products were characterized by the improved properties already described.

Summarizing, the introduction of amino groups into starches results in remarkably improved properties of great value in many industrial operations. Among these improvements are the greatly increased stability of aqueous dispersions of these materials against undue viscosity changes; the retention of their optimum physical properties under acidic conditions; the imparting of cationic properties to the starches or gums; their compatability with aqueous solutions of phenol, and their increased effectiveness in reactions with urea-formaldehyde and other resins capable of reacting with amines.

We claim:

1. The method of etherification of starch which consists in reacting ungelatinized starch in an alkaline medium, the alkali being present in an amount to avoid gelatinization of the starch granules, with an etherifying agent containing a tertiary amino radical and thereby introducing the tertiary amino radical into the starch through the ether linkage formed by the reaction of the etherifying agent and hydroxyl groups of the starch and obtaining the resulting starch ether in the form of an ungelatinized granular product in which the granular structure of the starch is retained.

2. The method of etherification of starch which consists in reacting ungelatinized starch in an alkaline medium, the alkali being present in an amount to avoid gelatinization of the starch granules, with an etherifying agent containing a tertiary amino radical thereby introducing the tertiary amino radical into the starch through the ether linkage formed by the reaction of the etherifying agent and hydroxyl groups of the starch and thereby producing a product having the following formula:

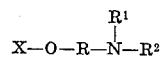

wherein X is starch, R is a radical selected from the group consisting of alkylene and hydroxyalkylene radicals, and each of $R^1$ and $R^2$ is a radical selected from the group consisting of alkyl, aryl and aralkyl radicals, said product being characterized by retention of the original ungelatinized granular structure of the starch.

3. The method of etherification of starch which consists in reacting ungelatinized starch in an alkaline medium, in the presence of a gelatinization retarding material, with an etherifying agent containing a tertiary amino radical and thereby introducing the tertiary amino radical into said starch through the ether linkage formed by the reaction of the etherifying agent and hydroxyl groups of the starch and obtaining the resulting starch ether in the form of an ungelatinized granular product in which the granular structure of the starch is retained.

4. The method of claim 3 in which the gelatinization retarding material is sodium sulfate.

5. The method of claim 1 in which the etherifying agent is dialkyl amino ethyl chloride hydrochloride.

6. The method of claim 1 in which the etherifying agent is dialkyl amino isopropyl chloride hydrochloride.

7. An ungelatinized etherification product of starch having the following structural formula:

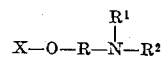

wherein X is starch, R is a radical selected from the group consisting of alkylene and hydroxyalkylene radicals and each of $R^1$ and $R^2$ is a radical selected from the group consisting of alkyl, aryl and aralkyl radicals, said product being characterized by retention of the original ungelatinized granular structure of the starch.

References Cited in the file of this patent

UNITED STATES PATENTS

| | | |
|---|---|---|
| 1,805,365 | Huber | May 12, 1931 |
| 2,116,867 | Kreimeier et al. | May 10, 1938 |
| 2,136,296 | Hardy | Nov. 8, 1938 |
| 2,621,174 | Gaver | Dec. 9, 1952 |
| 2,656,241 | Drake et al. | Oct. 20, 1953 |